US009884592B2

(12) United States Patent
Tseng (10) Patent No.: US 9,884,592 B2
(45) Date of Patent: Feb. 6, 2018

(54) ILLUMINATING DEVICE CAPABLE OF UNIFORMLY DIFFUSING LIGHT BEAMS AND SIDE VIEW MIRROR ASSEMBLY INCLUDING SAME

(71) Applicant: POLYWAY INDUSTRY CO., LTD., Tainan (TW)

(72) Inventor: Hsin-Chien Tseng, Tainan (TW)

(73) Assignee: POLYWAY INDUSTRY CO., LTD., Tainan (TW)

( * ) Notice: Subject to any disclaimer, the term of this patent is extended or adjusted under 35 U.S.C. 154(b) by 192 days.

(21) Appl. No.: 14/958,968

(22) Filed: Dec. 4, 2015

(65) Prior Publication Data

US 2017/0136953 A1    May 18, 2017

(51) Int. Cl.
| | | |
|---|---|---|
| B60Q 1/50 | (2006.01) | |
| F21V 5/02 | (2006.01) | |
| B60R 1/12 | (2006.01) | |
| B60R 1/00 | (2006.01) | |
| F21V 5/00 | (2015.01) | |
| F21Y 115/10 | (2016.01) | |

(52) U.S. Cl.
CPC .............. B60R 1/1207 (2013.01); B60Q 1/50 (2013.01); B60R 1/006 (2013.01); F21V 5/005 (2013.01); B60R 2001/1284 (2013.01); F21Y 2115/10 (2016.08)

(58) Field of Classification Search
CPC ......... B60Q 1/50; B60R 1/006; B60R 1/1207; F21K 9/69; G02B 5/0278; G02B 5/0231; G02B 5/045; G02B 6/0051; G02B 6/0053; G02F 2001/133603; G02F 2001/133607; H01H 3/83
See application file for complete search history.

(56) References Cited

U.S. PATENT DOCUMENTS

| | | | |
|---|---|---|---|
| 2002/0114149 A1* | 8/2002 | Yamashita | G02B 5/045 362/620 |
| 2004/0213000 A1 | 10/2004 | Chang | 362/328 |
| 2005/0265037 A1 | 12/2005 | Newton et al. | 362/494 |
| 2006/0291225 A1* | 12/2006 | Todd | B60Q 1/2665 362/494 |

(Continued)

FOREIGN PATENT DOCUMENTS

CN    102338344    2/2012    ............... F21V 5/02

*Primary Examiner* — Anh Mai
*Assistant Examiner* — Steven Horikoshi
(74) *Attorney, Agent, or Firm* — Alan D. Kamrath; Kamrath IP Lawfirm, P.A.

(57) ABSTRACT

An illuminating device (28) includes a light transmittable shield (38) having a first face (40) and a second face (42) spaced from the first face (40) in a direction. A chamber (43) is defined in the first face (40) and includes an operative face (46) spaced from the second face (42) in the direction. A plurality of refractive units (52) is provided on the operative face (46). Each refractive unit (52) includes a plurality refractive faces (54). Each refractive face (54) is at a non-parallel and non-perpendicular angle (55) to the operative face (46). Light diffusing particles (53) are disposed between the operative face (46) and the second face (42) and are located in the refractive units (52). At least one light emitting diode (34, 36) is fixed in relation to the light transmittable shield (38), is located in the chamber (43), and faces the operative face (46).

18 Claims, 11 Drawing Sheets

(56) References Cited

U.S. PATENT DOCUMENTS

| | | | |
|---|---|---|---|
| 2007/0297168 A1* | 12/2007 | Chang | G02B 5/0231 362/223 |
| 2009/0115631 A1 | 5/2009 | Foote et al. | 340/901 |
| 2011/0292655 A1 | 12/2011 | Ing et al. | 362/241 |
| 2012/0176772 A1* | 7/2012 | Maekawa | G02B 5/0278 362/97.1 |
| 2013/0100657 A1* | 4/2013 | Louh | G02B 3/0043 362/225 |
| 2013/0194795 A1* | 8/2013 | Onaka | F21V 5/04 362/231 |
| 2014/0268658 A1 | 9/2014 | Axtell et al. | 362/97.2 |

* cited by examiner

ILLUMINATING DEVICE CAPABLE OF UNIFORMLY DIFFUSING LIGHT BEAMS AND SIDE VIEW MIRROR ASSEMBLY INCLUDING SAME

BACKGROUND OF THE INVENTION

The present invention relates to an illuminating device and, more particularly, to an illuminating device capable of uniformly distributing light beams to alert a vehicle driver of the presence of a vehicle in the blind spot. The present invention also relates to a side view mirror assembly including the illuminating device.

Side view mirrors provided on two sides of a vehicle permit the driver of the vehicle to be aware of the road conditions on two sides of the vehicle. However, the driver cannot see vehicles in the blind spots at two sides of the vehicle. In an approach, a lighting element, such as a light emitting diode, is mounted in a housing of each side view mirror and is electrically connected to one of two sensors respectively mounted to two ends of a tail of the vehicle. A mirror of each side view mirror includes a light transmittable section aligned with one of the lighting elements. When one of the two sensors detects the presence of a vehicle in the blind spot at a side of the vehicle, the associated lighting element is activated to emit light beams to alert the driver of the vehicle in the blind spot. However, the light beams emitted from the lighting element could dazzle the eyes of the driver and could cause accidents. The risk of accidents is increased in the case of night driving in which the pupils of the driver dilate at night.

Thus, a need exists for a novel illuminating device to mitigate and/or obviate the above disadvantages.

BRIEF SUMMARY OF THE INVENTION

In a first aspect, the present invention provides an illuminating device including a light transmittable shield having a first face and a second face spaced from the first face in a direction. A chamber is defined in the first face and includes an operative face spaced from the second face in the direction. A plurality of refractive units is provided on the operative face. Each of the plurality of refractive units includes a plurality of bottom sides and a top spaced from the plurality of bottom sides in the direction. A plurality of refractive faces is formed between the top and the plurality of bottom sides. Each of the plurality of refractive faces is at a non-parallel and non-perpendicular angle to the operative face. A plurality of light diffusing particles is disposed between the operative face and the second face and is located in the plurality of refractive units. A first light emitting diode is fixed in relation to the light transmittable shield and is located in the chamber. The first light emitting diode is adapted to be electrically connected to a power source. The first light emitting diode faces the operative face. Light beams emitted from the first light emitting diode pass through and are refracted by the plurality of refractive faces. The light beams are then refracted by the plurality of light diffusing particles into diffused light beams passing through the second face of the light transmittable shield.

The first light emitting diode can be aligned with the top of one of the plurality of refractive units.

In an example, one of the plurality of bottom sides of each of two adjacent refractive units of the plurality of refractive units is shares a common bottom side of the two adjacent refractive units. The common bottom sides of the plurality of refractive units meet with each other at common points. The first light emitting diode is aligned with one of the common points.

The illuminating device can further include a plurality of second light emitting diodes received in the chamber and surrounding the first light emitting diode. The plurality of second light emitting diodes is adapted to be electrically connected to the power source. The plurality of second light emitting diodes has an equal spacing to the first light emitting diode. One of the plurality of bottom sides of each of two adjacent refractive units of the plurality of refractive units is a common bottom side of the two adjacent refractive units. The common bottom sides of the plurality of refractive units meet with each other at common points. Each of the plurality of second light emitting diodes is aligned with one of the tops or one of the common points.

The operative face can include 8-143 refractive units per square centimeter.

In an example, a ratio of a spacing between the top of each of the plurality of refractive units and the operative face in the direction to a spacing between the operative face and the second face in the direction is between 1.2:1 and 1.8:1.

In an example, a ratio of a spacing between the top of each of the plurality of refractive units and the operative face in the direction to a length of each of the plurality of bottom sides is between 1:2.7 and 1.3:1.

An angle between two adjacent bottom sides can be between 60° and 135°. In an example, the angle between two adjacent bottom sides is 120°.

The non-parallel and non-perpendicular angle between each of the plurality of refractive faces and the operative face can be between 40° and 80°. In an example, the non-parallel and non-perpendicular angle between each of the plurality of refractive faces and the operative face is 60°±2°.

The light transmittable shield includes 0.25-30 wt % of the light diffusing particles and 70-99.75 wt % of the light transmittable material. Preferably, the light transmittable shield includes 3-10 wt % of the light diffusing particles and 90-97 wt % of the light transmittable material. More preferably, the light transmittable shield includes 5 wt % of the light diffusing particles and 95 wt % of the light transmittable material.

In a second aspect, the present invention provides a side view mirror assembly including a side view mirror adapted to be mounted to a side of a vehicle. The side view mirror includes a mirror having a light transmittable section. A light transmittable shield is fixed in relation to the mirror and includes a first face and a second face spaced from the first face in a direction. A chamber is defined in the first face and includes an operative face spaced from the second face in the direction. The operative face is aligned with the light transmittable section of the mirror. A plurality of refractive units is provided on the operative face. Each of the plurality of refractive units includes a plurality of bottom sides and a top spaced from the plurality of bottom sides in the direction. A plurality of refractive faces is formed between the top and the plurality of bottom sides. Each of the plurality of refractive faces is at a non-parallel and non-perpendicular angle to the operative face. A plurality of light diffusing particles is disposed between the operative face and the second face and is located in the plurality of refractive units. A first light emitting diode is fixed in relation to the light transmittable shield and is located in the chamber. The first light emitting diode faces the operative face and is aligned with the light transmittable section of the mirror. Light beams emitted from the first light emitting diode pass through and are refracted by the plurality of refractive faces. The light beams are then refracted by the plurality of plurality of light diffusing particles into uniform light beams passing through the second face of the light transmittable shield.

The side view mirror can further include a mirror seat having a first side and a second side. A window extends from the first side through the second side. The mirror is mounted to the second side. The light transmittable section of the mirror is aligned with the window. A pad is sandwiched between the first side of the mirror seat and the second face of the light transmittable shield. The pad includes a through-hole having a shape identical to and aligned with the light transmittable section. The operative face of the light transmittable shield is aligned with the window. A circuit board is fixed in the chamber of the light transmittable shield. The first light emitting diode is mounted to the circuit board. A cover is securely mounted to the light transmittable shield. The cover is configured to be securely mounted to the first side of the mirror seat.

One of the plurality of bottom sides of each of two adjacent refractive units of the plurality of refractive units is shares a common bottom side of the two adjacent refractive units. The common bottom sides of the plurality of refractive units meet with each other at common points. The first light emitting diode is aligned with one of the common points.

The side view mirror assembly can further include a plurality of second light emitting diodes received in the chamber and surrounding the first light emitting diode. The plurality of second light emitting diodes has an equal spacing to the first light emitting diode. Each of the plurality of second light emitting diodes is aligned with one of the tops or one of the common points.

In an example, a ratio of a spacing between the top of each of the plurality of refractive units and the operative face in the direction to a spacing between the operative face and the second face in the direction is between 1.2:1 and 1.8:1.

In an example, the operative face includes 8-143 refractive units per square centimeter. An angle between two adjacent bottom sides is between 60° and 135°. The non-parallel and non-perpendicular angle between each of the plurality of refractive faces and the operative face is between 40° and 80°. The light transmittable shield includes 0.25-30 wt % of the light diffusing particles and 70-99.75 wt % of the light transmittable material.

The present invention will become clearer in light of the following detailed description of illustrative embodiments of this invention described in connection with the drawings.

DETAILED DESCRIPTION OF THE INVENTION

FIGS. 1-8 show an illuminating device 28 of an example according to the present invention. Illuminating device 28 includes a light transmittable shield 38 having a first face 40 and a second face 42 spaced from first face 40 in a direction. A chamber 43 is defined in first face 40 and includes an operative face 46 spaced second face 42 in the direction. An annular wall 44 extends between first and second faces 40 and 42 and have two fixing portions 60. In this example, a first recessed portion 47 extends in the direction from first face 40 towards but spaced from second face 42. A second recessed portion 45 extends in the direction from a bottom wall of first recessed portion 47 towards but spaced from second face 42. Second recessed portion 45 has a bottom wall forming operative face 46. First recessed portion 47 includes an inner peripheral face 48 having two chamfered faces 50.

Light transmittable shield 38 is made of a light transmittable material and a plurality of light diffusing particles 53. The light transmittable material includes, but not limited to, polycarbonate (PC), polymethyl methacrylate (PMMA), and polystyrene (PS). The plurality of light diffusing particles 53 is disposed between operative face 46 and second face 42. The plurality of light diffusing particles 53 is made of at least one diffusing agent including, but not limited to, acrylate polymers, titanium oxide, mineral powders, diffusion powders, and talcum powders. These materials are transparent or translucent to permit transmission of light. These materials are processed by polymer technology to obtain the plurality of light diffusing particles 53 which is transmittable to light.

Light transmittable shield 38 includes 0.25-30 wt % of the plurality of light diffusing particles 53 and 70-99.75 wt % of light transmittable material. Preferably, light transmittable shield 38 includes 3-10 wt % of the plurality of light diffusing particles 53 and 90-97 wt % of light transmittable material. More preferably, light transmittable shield 38 includes 5 wt % of the plurality of light diffusing particles 53 and 95 wt % of light transmittable material.

A pad 92 can be bonded to second face 42 of light transmittable shield 38. Pad 92 includes a through-hole 94 having a shape in the form of a triangle, a polygon, a circle, an ellipse, or any other shape in cross section.

Figure 1:
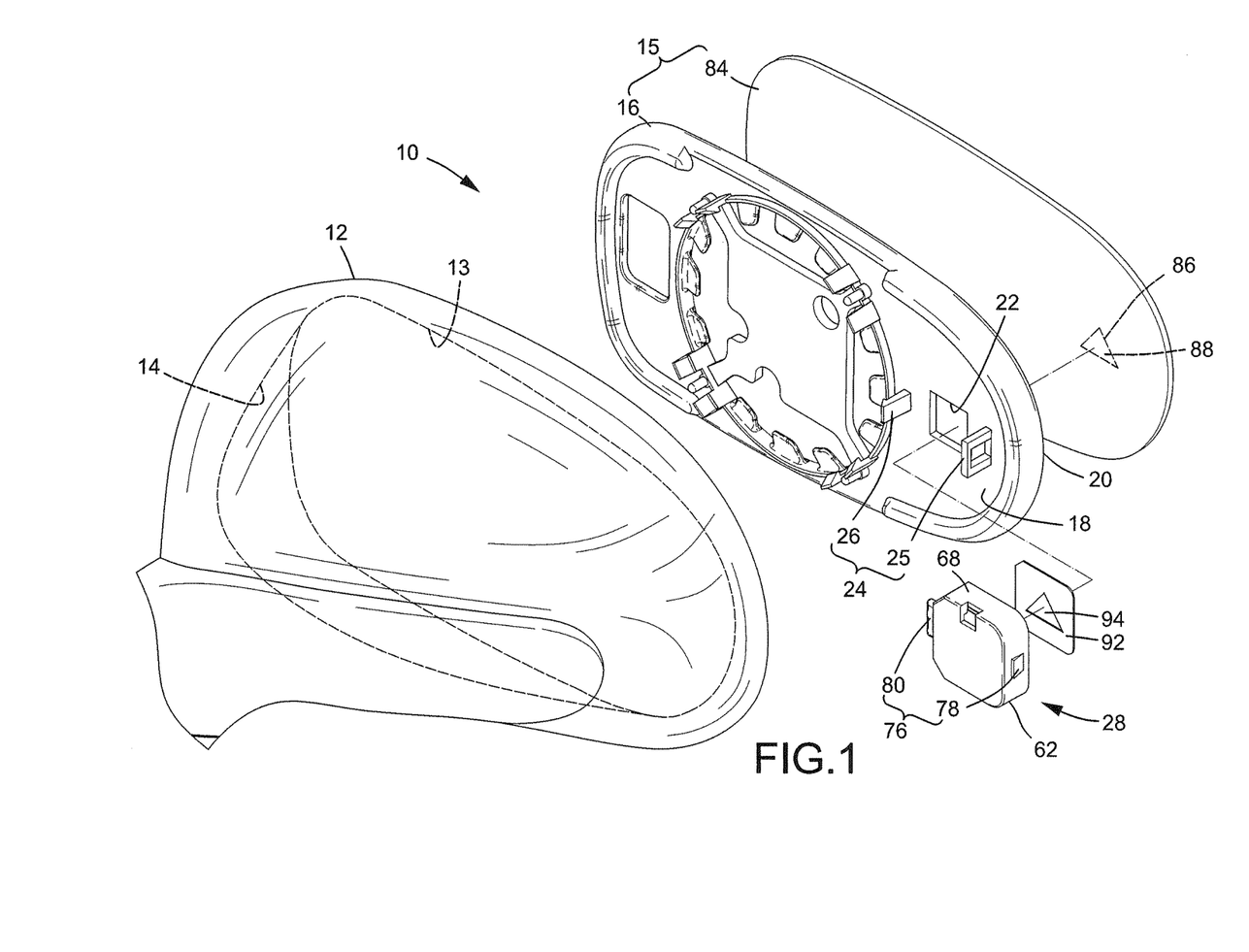
FIG. 1 is an exploded, perspective view of an illuminating device of an example according to the present invention and of a side view mirror of a vehicle to which the illuminating device is mounted.
Figure 2:
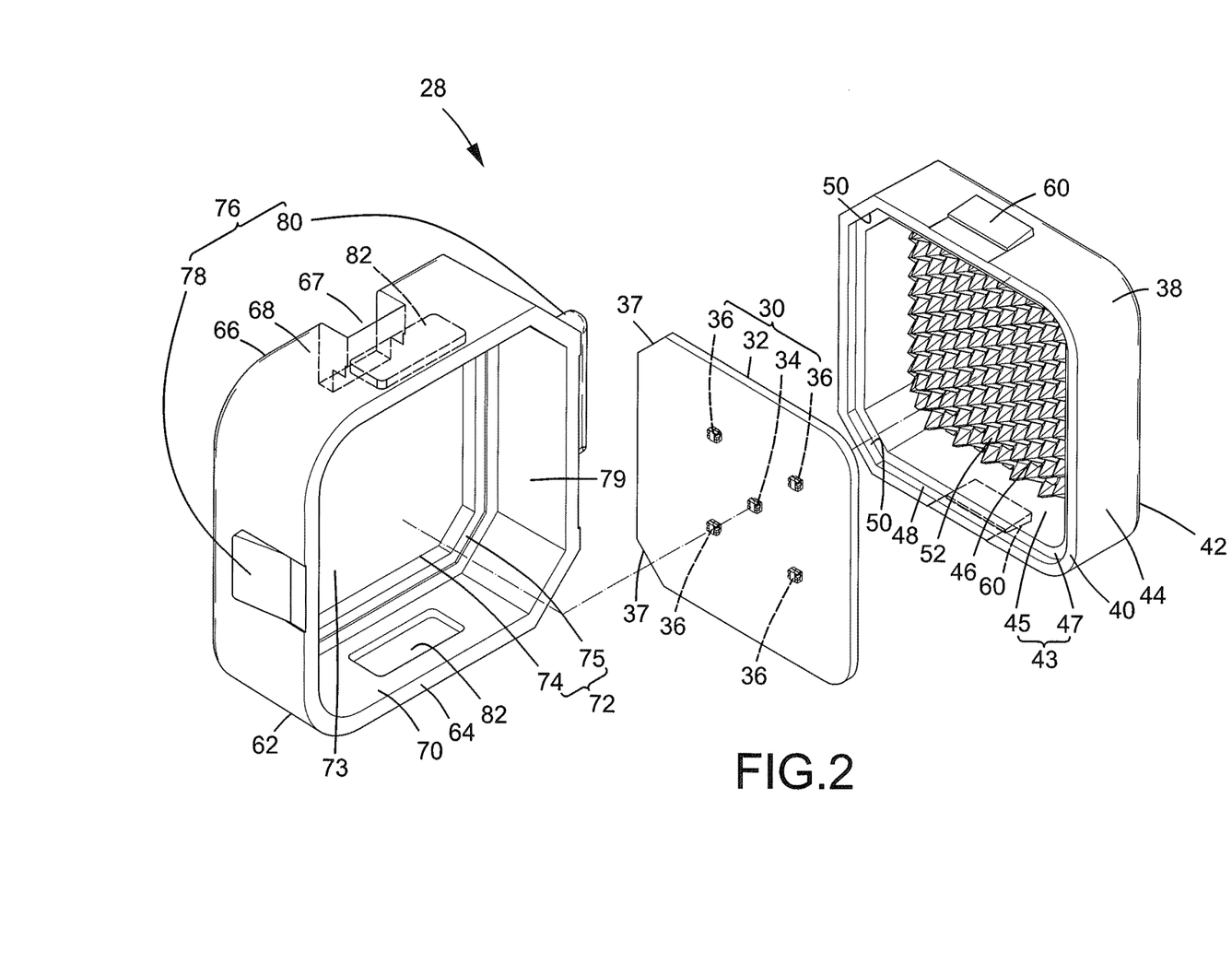
FIG. 2 is an exploded, perspective view of the illuminating device of FIG. 1.
Figure 3:
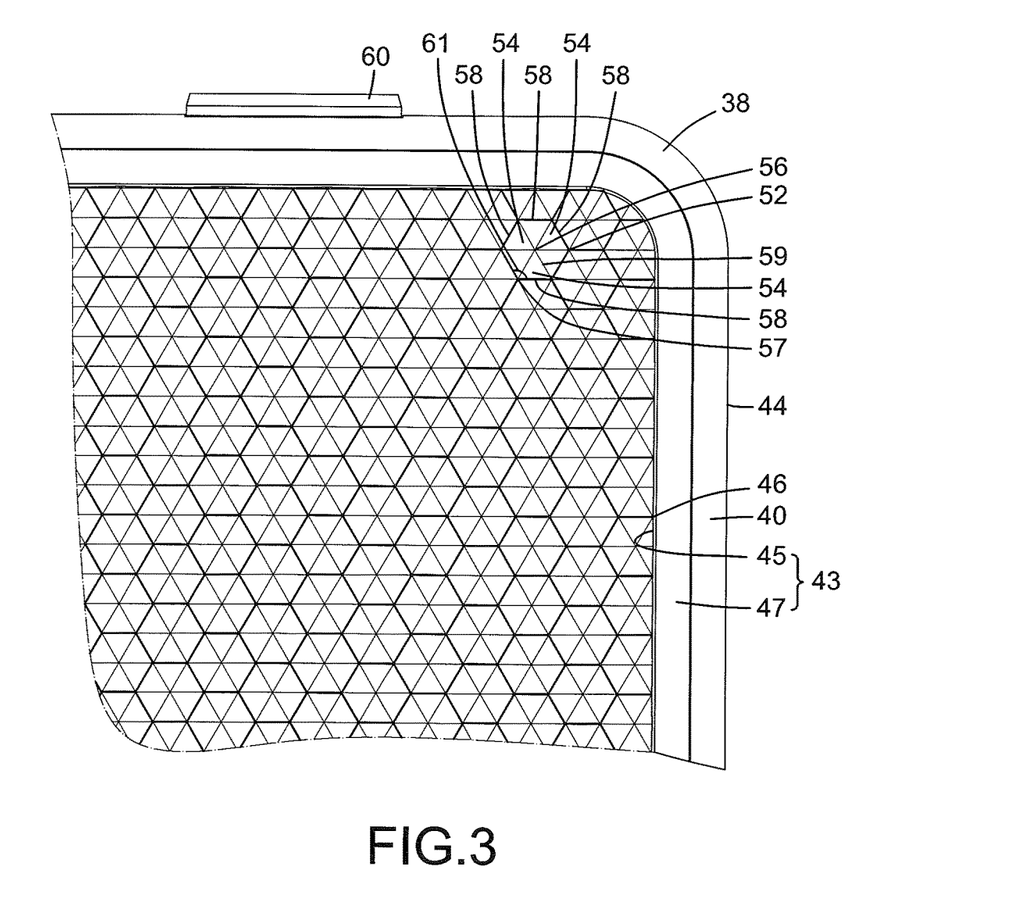
FIG. 3 is a partial, front view of a light transmittable shield of the illuminating device of FIG. 2.
Figure 4:
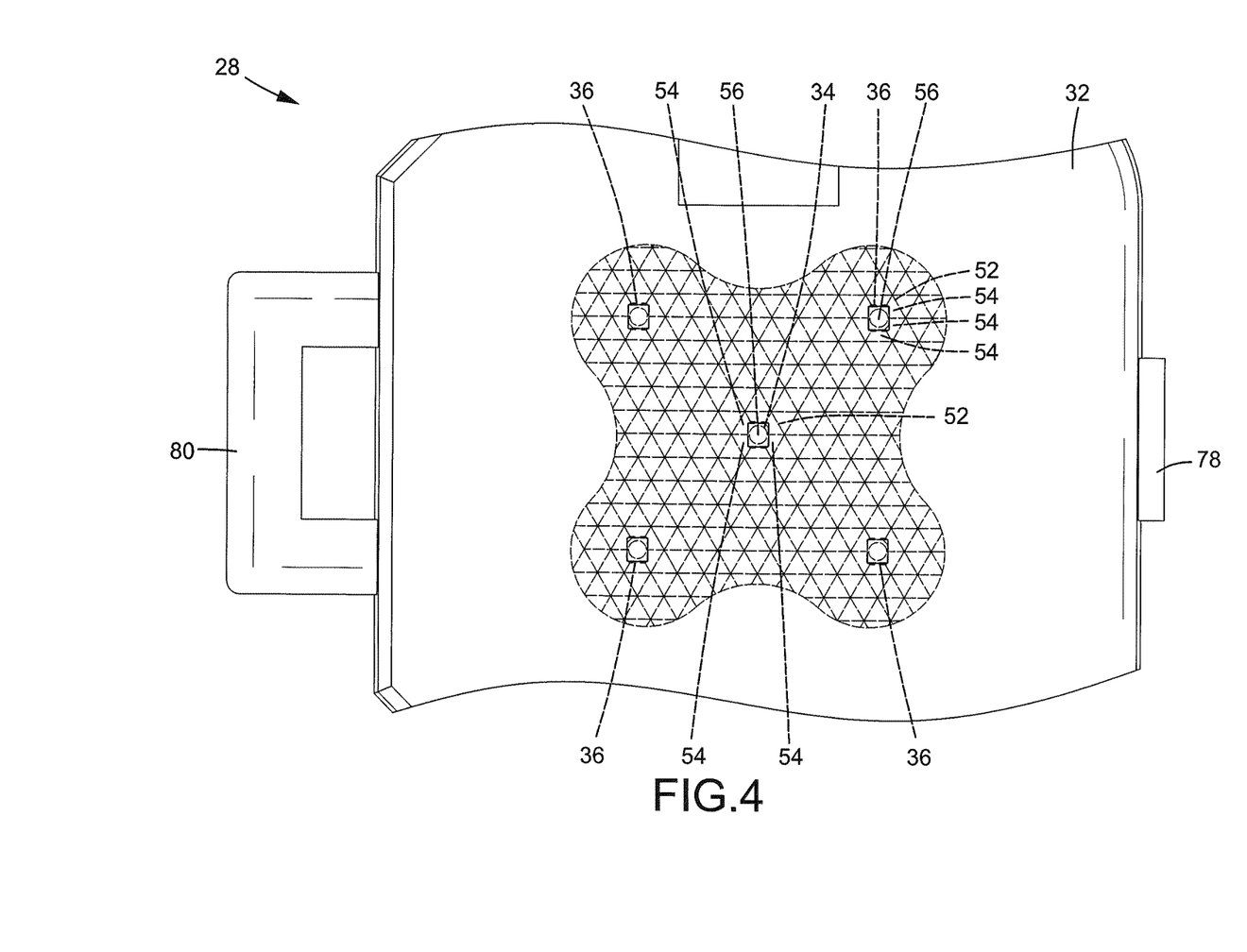
FIG. 4 is a front view of the illuminating device of FIG. 2 after assembly.
Figure 5:
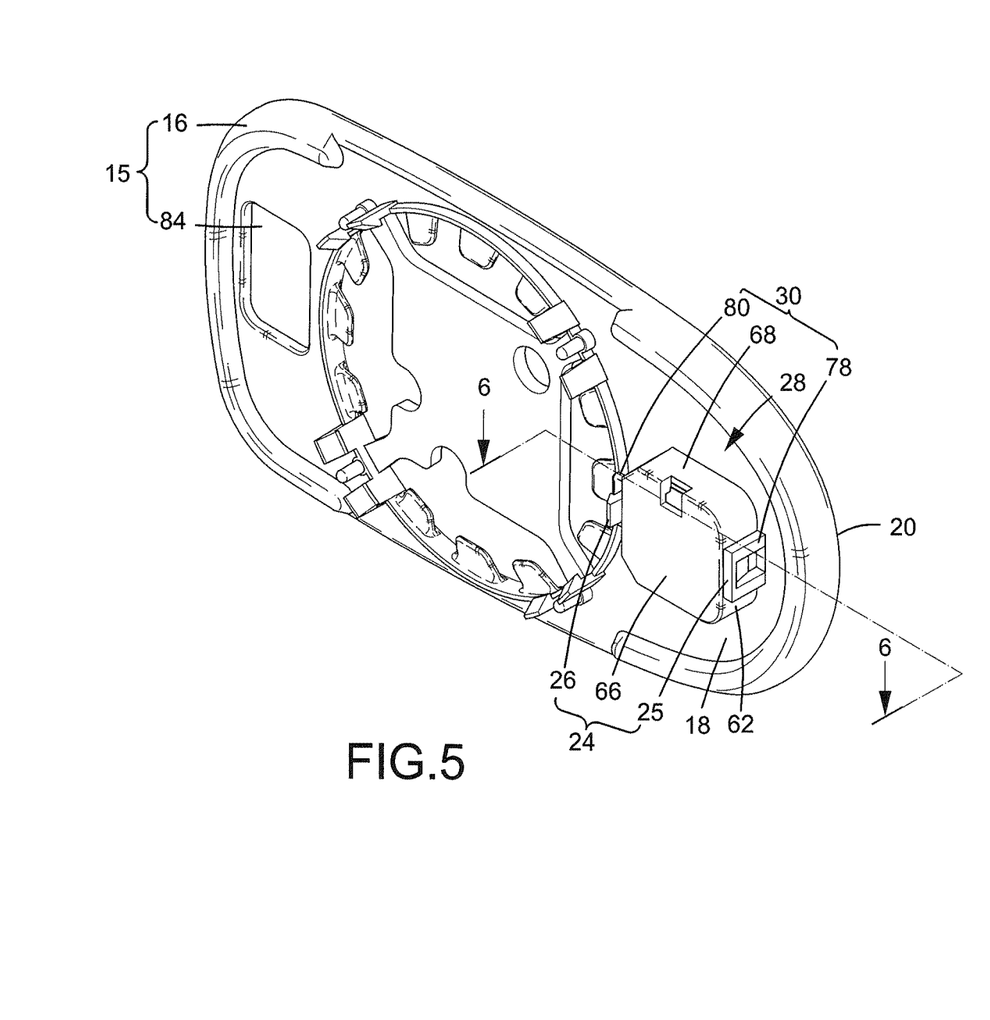
FIG. 5 is a perspective view of the illuminating device and the side view mirror of FIG. 1 after assembly.
Figure 6:
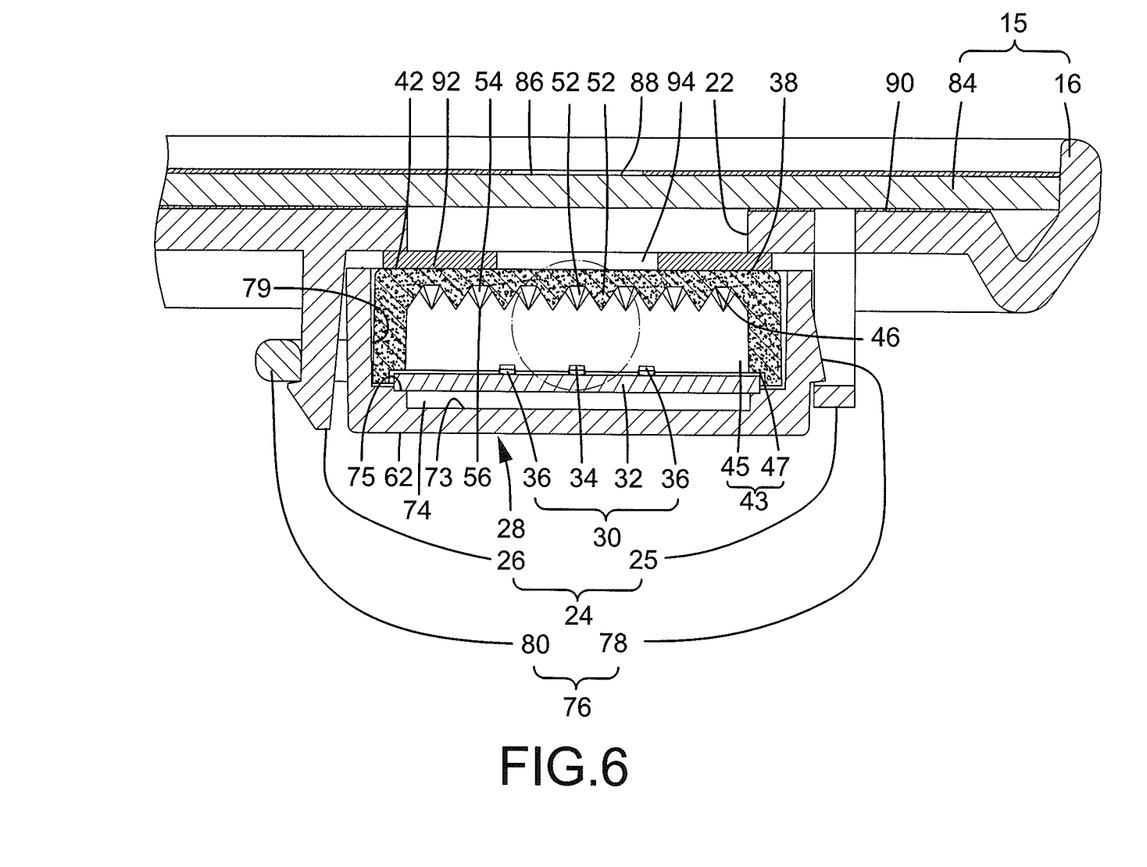
FIG. 6 is a cross sectional view taken along section line 6-6 of FIG. 5.

A plurality of refractive units 52 is provided on operative face 46. Operative face 46 includes 8-143 refractive units 52 per square centimeter. In the form shown, each refractive unit 52 is in the form of a pyramid including a base having a plurality of bottom sides 58 and a top 56 spaced from the plurality of bottom sides 58 in the direction. Top 56 is pointed in this example. A plurality of refractive faces 54 is formed between top 56 and the plurality of bottom sides 58. Each refractive face 54 includes top 56 and one of plurality of bottom sides 58. Two adjacent refractive faces 54 of each refractive unit 52 share a common lateral side 59. One of the plurality of bottom sides 58 of each of two adjacent refractive units 52 of the plurality of refractive units 52 is a common bottom side 58 of the two adjacent refractive units 52. The common bottom sides 58 of the plurality of refractive units 52 meet with each other at common points 57 (FIG. 3). The plurality of light diffusing particles 53 is located in refractive units 52.

Figure 7:
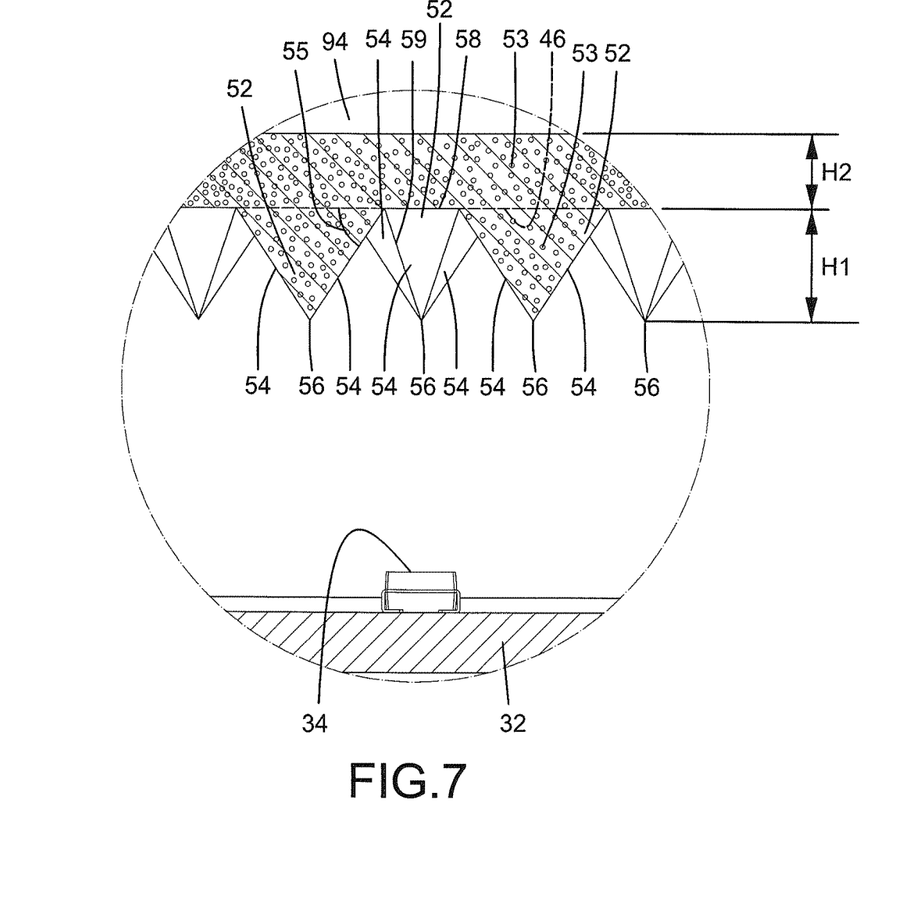
FIG. 7 is an enlarged view of a circled portion of FIG. 6.

In each of the plurality of refractive units 52, each of the plurality of refractive faces 54 is at a non-parallel and non-perpendicular angle 55 (FIG. 7) to operative face 46. Non-parallel and non-perpendicular angle 55 is between 40° and 80°, preferably between 50° and 70°, and most preferably 60°±2°. Furthermore, a ratio of a spacing H1 between top 56 of each of the plurality of refractive units 52 and operative face 46 in the direction to a spacing H2 between operative face 46 and second face 42 in the direction is between 1.2:1 and 1.8:1 (FIG. 7). In the form shown, spacing H1 is about 1.5 mm (about 0.059 inches), and spacing H2 is about 1 mm (about 0.0394 inches).

Furthermore, in each of the plurality of refractive units 52, an angle 61 (FIG. 3) between two adjacent bottom sides 58 is between 60° and 135°. The base of each of the plurality of refractive units 52 can be polygonal, such as triangular, rectangular, pentagonal, hexagonal, or octagonal. Angles 61 of a triangular base, a hexagonal base, and an octagonal base are 60°, 120°, and 135°, respectively. A ratio of spacing H1 between top 56 of each of the plurality of refractive units 52 and operative face 46 in the direction to a length of each of the plurality of bottom sides 58 is between 1:2.7 and 1.3:1.

In this example, illuminating device 28 further includes a circuit board 32 and a lighting unit 30 mounted on and electrically connected to circuit board 32. Circuit board 32 includes two chambered faces 37. Lighting unit 30 includes a first light emitting diode (LED) 34 and a plurality of second light emitting diodes 36 surrounding first LED 34. The plurality of second LEDs 36 has an equal spacing to first LED 34. Circuit board 32 is mounted in first recessed portion 47. Two chamfered faces 37 of circuit board 32 abut two chamfered faces 50 of first recessed portion 47. First LED 34 and the plurality of second LEDs 36 are fixed in relation to light transmittable shield 38, are located in chamber 43, and face operative face 46.

In this example, first LED 34 is aligned with top 56 of one of the plurality of refractive units 52 (FIG. 4), and the light beams emitted from first LED 34 covers the plurality of refractive faces 54 adjacent to top 56 of the one of the plurality of refractive units 52. In an alternative example, first LED 34 is aligned with one of common points 57, and the light beams emitted from first LED 34 cover the plurality of refractive faces 54 adjacent to the one of the common points 57.

Each of the plurality of second LEDs 36 is aligned with top 56 of one of the plurality of refractive units 52 (FIG. 4) and emits light beams covering the plurality of refractive faces 54 adjacent to top 56 of the one of the plurality of refractive units 52. In an alternative example, each of the plurality of second LEDs 36 is aligned with one of common points 57 and emits light beams covering the plurality of refractive faces 54 adjacent to the one of the common points 57. In another alternative example, at least one of the plurality of second LEDs 36 is aligned with a corresponding number of tops 56, and each of the remaining second LEDs 36 is aligned with one of common points 57.

In this example, illuminating device 28 further includes a cover 62 having first and second surfaces 64 and 66. A first peripheral face 68 extends between first and second surfaces 64 and 66 and includes a positioning mechanism 76 having a hook 78 and an engagement piece 80. A receiving space 72 is defined in first surface 64 and is delimited by a bottom face 73 spaced from second surface 66 and a second peripheral face 70 spaced from first peripheral face 68. Second peripheral face 70 includes two engagement portions 82 engaged with fixing portions 60 of light transmittable shield 38. A through-hole 67 extends from bottom face 73 through second surface 66. In the form shown, a recessed portion 79 extends from first surface 64, a first groove 75 extends from a bottom wall of recessed portion 79, and a second groove 74 extends from a bottom wall of receiving space 72 and includes bottom face 73. The cross sectional area of first groove 75 is larger than the cross sectional area of annular wall 44 of light transmittable shield 38. Light transmittable shield 38 is received in receiving space 72 of cover 62. A side of circuit board 32 abuts the bottom wall of first groove 75. Two engagement portions 82 of cover 62 engage with fixing portions 60 of light transmittable shield 38 to fix cover 62 around light transmittable shield 38.

Illuminating device 28 can be mounted in a side view mirror 10 (FIG. 1) mounted to a vehicle, forming a side view mirror assembly. Illuminating device 28 can alert a driver of the vehicle that another vehicle is in the blind spot of the vehicle. Side view mirror 10 includes a housing 12 having a compartment 14 with an opening 13. Side view mirror 10 further includes a mirror unit 15 including a mirror seat 16 and a mirror 84. Mirror seat 16 includes a first side 18 and a second side 20. A window 22 extends from first side 18 through second side 20. An engagement mechanism 24 is provided on first side 18 and includes an engagement mechanism 24. In the form shown, engagement mechanism 24 includes an engagement plate 25 and a hook 26 on two sides of window 22. Mirror seat 16 is mounted in compartment 14. Second side 20 of mirror seat 16 is located in opening 13. Mirror 84 includes a light transmittable section 86 having an intermediate section 88. In the form shown, an area of light transmittable section 86 is smaller than an area of window 22. Mirror 84 can be mounted to second side 20 by an adhesive layer 90. Light transmittable section 86 of mirror 84 is aligned with window 22.

Illuminating device 28 is mounted to first side 18 of mirror seat 16. Second face 42 of light transmittable shield 38 faces window 22. Hook 78 of cover 62 engages with engagement plate 25 of mirror seat 16, and engagement piece 80 of cover 62 engages with hook 26 of mirror seat 16. After coupling illuminating device 28 and mirror seat 16, pad 92 is sandwiched between first side 18 of mirror seat 16 and second face 42 of light transmittable shield 38, and first LED 34 and the plurality of second LEDs 36 are aligned with through-hole 94 of pad 92 and light transmittable section 86 of mirror 84. Note that the shape of through-hole 94 of pad 92 can be the same as the shape of light transmittable section 86 of mirror 84.

A wire from circuit board 32 extends through through-hole 67 and is connected to a sensor (not shown) mounted to one of two ends of a tail of the vehicle to which the side view mirror is mounted. First and second light emitting diodes 34 and 36 are adapted to be electrically connected to a power source in the vehicle to which side view mirror 10 is mounted.

Figure 8:
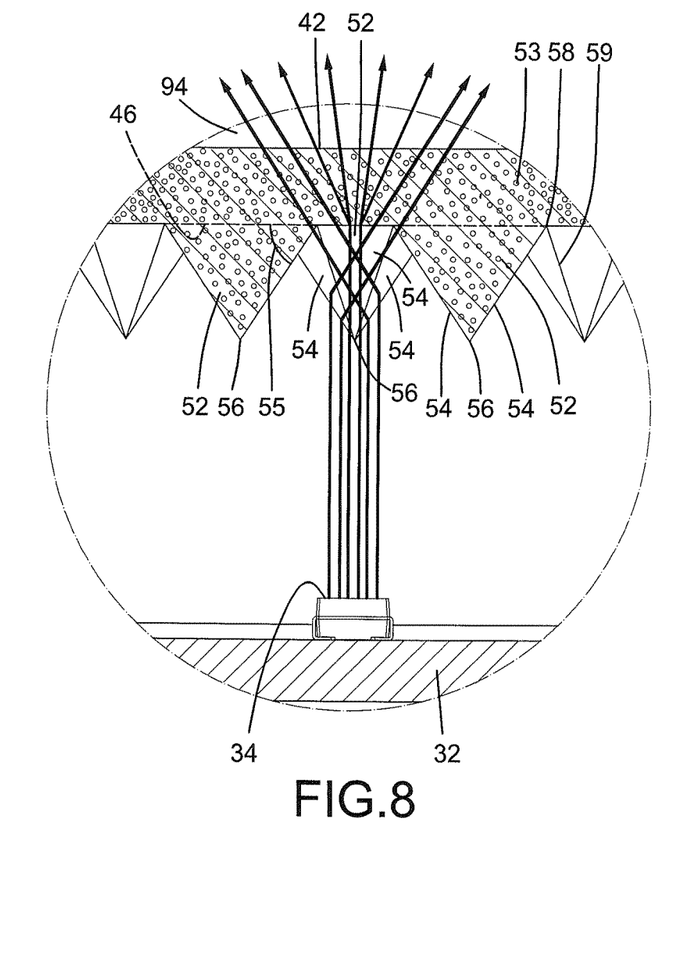
FIG. 8 is a view similar to FIG. 7, illustrating operation of the illuminating device.

In operation of the form shown, in a case that the sensor on the tail of the vehicle detects that another vehicle is in a blind spot of the vehicle, first LED 34 and the plurality of second LEDs 36 are activated to emit light beams. The light beams pass through the plurality of refractive faces 54 and are refracted by the plurality of refractive faces 54 into the plurality of refractive units 52. Then, the light beams are refracted by the plurality of light diffusing particles 53 into uniform light beams which subsequently pass through second face 42, through-hole 94 of pad 92, window 22, and light transmittable section 86 of mirror 84. The driver can see the light beams from the illuminating device 28 indicating the presence of another vehicle in the blind spot. Due to the difference between the refractivity of the plurality of light diffusing particles 53 and the refractivity of the light transmittable material, multi-refraction of the light beams in various directions can be obtained. Thus, before exiting second face 42, the light beams emitted from first LED 34 and the plurality of second LEDs 36 can be refracted by the plurality of refractive units 52 to provide a large projection area after diffusion.

Specifically, the plurality of refractive faces 54 of the plurality of refractive units 52 of light transmittable shield 38 refract the light beams from first LED 34 and the plurality of second LEDs 36 from different angles, such that the light beams can be uniformly mixed after the first refraction by the plurality of refractive faces 54. Then, the second refraction provided by the plurality of light diffusing particles 53 make the light beams more uniform and soft, such that the light beams passing through second face 42 will not dazzle the eyes of the driver of the vehicle.

Figure 9:
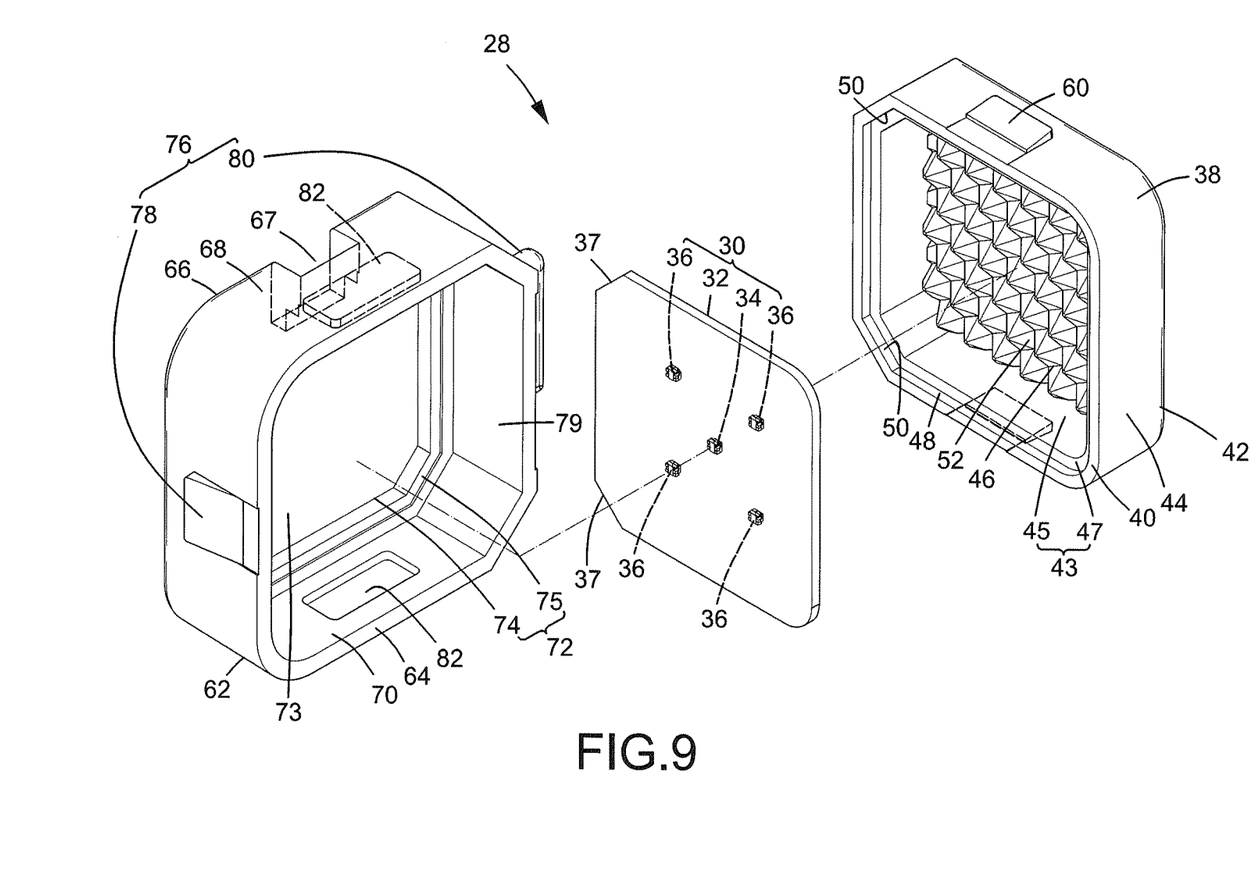
FIG. 9 is an exploded, perspective view of an illuminating device of another example according to the present invention.
Figure 10:
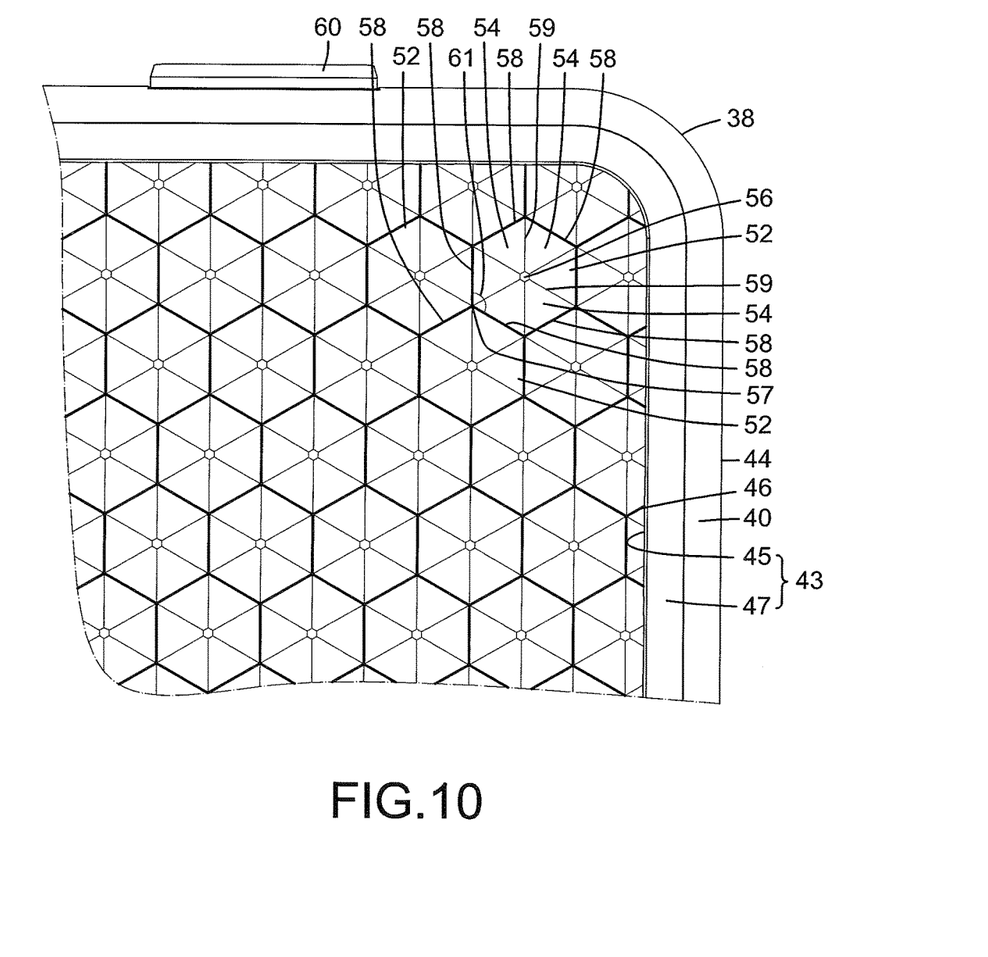
FIG. 10 is a partial, front view of a light transmittable shield of the illuminating device of FIG. 9.
Figure 11:
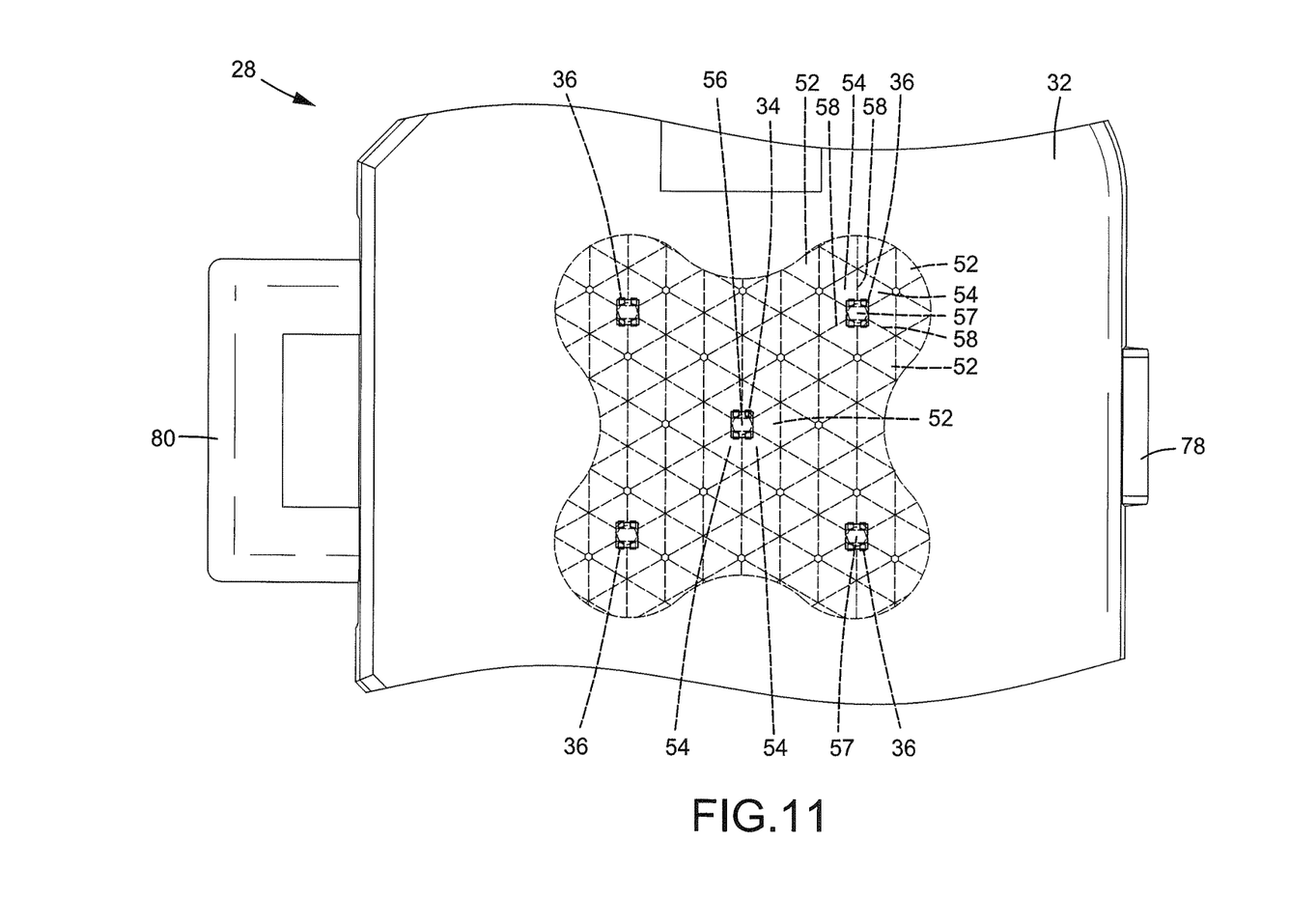
FIG. 11 is a front view of the illuminating device of FIG. 9 after assembly.

FIGS. 9-11 show another example of light transmittable shield 38. Specifically, top 56 of each of the plurality of refractive units 52 is a plane parallel to operative face 46. Thus, top 56 of each of the plurality of refractive units 52 can serve as a refractive face at a different angular location for refracting light beams, such that the first refraction is more uniform.

Now that the basic teachings of the present invention have been explained, many extensions and variations will be obvious to one having ordinary skill in the art. For example, illuminating device 28 does not have to include the plurality of second LEDs 36 and pad 92. Alternatively, the number of the plurality of second LEDs 36 can be changed according to needs. Furthermore, light transmittable shield 38 can be made of the light transmittable material and the plurality of light diffusing particles 53 by injection molding, such that the plurality of light diffusing particles 53 is located between operative face 46 and second face 42, is located in the plurality of refractive units 52, and is located in annular wall 44. In another injection molding provision, a mixture of the light transmittable material and the plurality of light diffusing particles 53 is subject to first injection molding to form the plurality of refractive units 52 and a board including operative face 46 and second face 42, and an annular wall 44 is formed along a periphery of the board by second injection molding and encloses the plurality of refractive units 52.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. An illuminating device comprising:
a light transmittable shield including a first face and a second face spaced from the first face in a direction, with a chamber defined in the first face and including an operative face spaced from the second face in the direction, with a plurality of refractive units provided on the operative face, with each of the plurality of refractive units including a plurality of bottom sides and a top spaced from the plurality of bottom sides in the direction, with a plurality of refractive faces formed between the top and the plurality of bottom sides, with each of the plurality of refractive faces being at a non-parallel and non-perpendicular angle to the operative face, and with a plurality of light diffusing particles disposed between the operative face and the second face and located in the plurality of refractive units; and
a first light emitting diode fixed in relation to the light transmittable shield and located in the chamber, with the first light emitting diode adapted to be electrically connected to a power source, with the first light emitting diode facing the operative face, wherein light beams emitted from the first light emitting diode pass through and are refracted by the plurality of refractive faces, and the light beams are then refracted by the plurality of light diffusing particles into diffused light beams passing through the second face of the light transmittable shield,
wherein the first light emitting diode is aligned with the top of one of the plurality of refractive units.

2. The illuminating device as claimed in claim 1, wherein the operative face includes 8-143 refractive units per square centimeter.

3. The illuminating device as claimed in claim 1, wherein a ratio of a spacing between the top of each of the plurality of refractive units and the operative face in the direction to a spacing between the operative face and the second face in the direction is between 1.2:1 and 1.8:1.

4. The illuminating device as claimed in claim 1, wherein a ratio of a spacing between the top of each of the plurality of refractive units and the operative face in the direction to a length of each of the plurality of bottom sides is between 1:2.7 and 1.3:1.

5. The illuminating device as claimed in claim 1, wherein an angle between two adjacent bottom sides is between 60° and 135°.

6. The illuminating device as claimed in claim 5, wherein the angle between two adjacent bottom sides is 120°.

7. The illuminating device as claimed in claim 1, wherein the non-parallel and non-perpendicular angle between each of the plurality of refractive faces and the operative face is between 40° and 80°.

8. The illuminating device as claimed in claim 7, wherein the non-parallel and non-perpendicular angle between each of the plurality of refractive faces and the operative face is 60°±2°.

9. The illuminating device as claimed in claim 1, wherein the light transmittable shield includes 0.25-30 wt % of the plurality of light diffusing particles and 70-99.75 wt % of a light transmittable material.

10. The illuminating device as claimed in claim 9, wherein the light transmittable shield includes 3-10 wt % of the plurality of light diffusing particles and 90-97 wt % of the light transmittable material.

11. The illuminating device, as claimed in claim 10, wherein the light transmittable shield includes 5 wt % of the plurality of light diffusing particles and 95 wt % of the light transmittable material.

12. An illuminating device comprising:
a light transmittable shield including a first face and a second face spaced from the first face in a direction, with a chamber defined in the first face and including an operative face spaced from the second face in the direction, with a plurality of refractive units provided on the operative face, with each of the plurality of refractive units including a plurality of bottom sides and a top spaced from the plurality of bottom sides in the direction, with a plurality of refractive faces formed between the top and the plurality of bottom sides, with each of the plurality of refractive faces being at a non-parallel and non-perpendicular angle to the operative face, and with a plurality of light diffusing particles disposed between the operative face and the second face and located in the plurality of refractive units; and a first light emitting diode fixed in relation to the light transmittable shield and located in the chamber, with the first light emitting diode adapted to be electrically connected to a power source, with the first light emitting diode facing the operative face, wherein light beams emitted from the first light emitting diode pass through and are refracted by the plurality of refractive faces, and the light beams are then refracted by the plurality of light diffusing particles into diffused light beams passing through the second face of the light transmittable shield, with one of the plurality of bottom sides of each of two adjacent refractive units of the plurality of refractive units being sharing a common bottom side of the two adjacent refractive units, with the common bottom sides of the plurality of refractive units meeting with each other at common points, and with the first light emitting diode aligned with one of the common points.

13. An illuminating device comprising:

a light transmittable shield including a first face and a second face spaced from the first face in a direction, with a chamber defined in the first face and including an operative face spaced from the second face in the direction, with a plurality of refractive units provided on the operative face, with each of the plurality of refractive units including a plurality of bottom sides and a top spaced from the plurality of bottom sides in the direction, with a plurality of refractive faces formed between the top and the plurality of bottom sides, with each of the plurality of refractive faces being at a non-parallel and non-perpendicular angle to the operative face, and with a plurality of light diffusing particles disposed between the operative face and the second face and located in the plurality of refractive units;

a first light emitting diode fixed in relation to the light transmittable shield and located in the chamber, with the first light emitting diode adapted to be electrically connected to a power source, with the first light emitting diode facing the operative face, wherein light beams emitted from the first light emitting diode pass through and are refracted by the plurality of refractive faces, and the fight beams are then refracted by the plurality of light diffusing particles into diffused light beams passing through the second face of the light transmittable shield; and a plurality of second light emitting diodes received in the chamber and surrounding the first light emitting diode, with the plurality of second light emitting diodes adapted to be electrically connected to the power source, with the plurality of second light emitting diodes having equal spacing to the first light emitting diode, with one of the plurality of bottom sides of each of two adjacent refractive units of the plurality of refractive units being a common bottom side of the two adjacent refractive units, wherein the common bottom sides of the plurality of refractive units meet with each other at common points, and wherein each of the plurality of second light emitting diodes is aligned with one of the tops or one of the common points.

14. A side view mirror assembly comprising:

a side view mirror adapted to be mounted to a side of a vehicle, with the side view mirror including a mirror having a light transmittable section;

a light transmittable shield fixed in relation to the mirror and including a first face and a second face spaced from the first face in a direction, with a chamber defined in the first face and including an operative face spaced from the second face in the direction, with the operative face aligned with the light transmittable section of the mirror, with a plurality of refractive units provided on the operative face, with each of the plurality of refractive units including a plurality of bottom sides and a top spaced from the plurality of bottom sides in the direction, with a plurality of refractive faces formed between the top and the plurality of bottom sides, with each of the plurality of refractive faces being at a non-parallel and non-perpendicular angle, to the operative face, and with a plurality of light diffusing particles disposed between the operative face and the second face and located in the plurality of refractive units; and a first light emitting diode fixed in relation to the light transmittable shield and located in the chamber, with the first light emitting diode facing the operative face and aligned with the light transmittable section of the mirror, wherein light beams emitted from the first light emitting diode pass through and are refracted by the plurality of refractive faces, and the light beams are then refracted by the plurality of light diffusing particles into uniform light beams passing through the second face of the light transmittable shield, with one of the plurality of bottom sides of each of two adjacent refractive units of the plurality of refractive units being sharing a common bottom side of the two adjacent refractive units, with the common bottom sides of the plurality of refractive units meeting with each other at common points, and with the first light emitting diode aligned with one of the common points.

15. The side view mirror assembly as claimed in claim 14, with the side view mirror further including a mirror seat having a first side and a second side, with a window extending from the first side through the second side, with the mirror mounted to the second side, with the light transmittable section of the mirror aligned with the window, with a pad sandwiched between the first side of the mirror seat and the second face of the light transmittable shield, with the pad including a through-hole having a shape identical to and aligned with the light transmittable section, with the operative face of the light transmittable shield aligned with the window, with a circuit board fixed in the chamber of the light transmittable shield, with the first light emitting diode mounted to the circuit board, with a cover securely mounted to the light transmittable shield, and with the cover configured to be securely mounted to the first side of the mirror seat.

16. The side view mirror assembly as claimed in claim 14, wherein a ratio of a spacing between the top of each of the plurality of refractive units and the operative face in the direction to a spacing between the operative face and the second face in the direction is between 1.2:1 and 1.8:1.

17. The side view mirror assembly as claimed in claim 14, with the operative face including 8-143 refractive units per square centimeter, with an angle between two adjacent bottom sides being between 60° and 135°, with the non-parallel and non-perpendicular angle between each of the plurality of refractive faces and the operative face being between 40° and 80°, and with the light transmittable shield including 0.25-30 wt % of the plurality of light diffusing particles and 70-99.75 wt % of a light transmittable material.

18. A side view mirror assembly comprising:

a side view mirror adapted to be mounted to a side of a vehicle, with the side view mirror including a mirror having a light transmittable section;

a light transmittable shield fixed in relation to the mirror and including a first face and a second face spaced from the first face in a direction, with a chamber defined in the first face and including an operative face spaced from the second face in the direction, with the operative face aligned with the light transmittable section of the mirror, with a plurality of refractive units provided on the operative face, with each of the plurality of refractive units including a plurality of bottom sides and a top spaced from the plurality of bottom sides in the direction, with a plurality of refractive faces formed between the top and the plurality of bottom sides, with each of the plurality of refractive faces being at a non-parallel and non-perpendicular angle to the operative face, and with a plurality of light diffusing particles disposed between the operative face and the second face and located in the plurality of refractive units; and a first light emitting diode fixed in relation to the light transmittable shield and located in the chamber, with the first light emitting diode facing the operative face and aligned with the light transmittable section of the mirror, wherein light beams emitted from the first light emitting diode pass through and are refracted by the plurality of refractive faces, and the light beams are then refracted by the plurality of light diffusing particles into uniform light beams passing through the second face of the light transmittable shield; and a plurality of second light emitting diodes received in the chamber and surrounding the first light emitting diode, with the plurality of second light emitting diodes having an equal spacing to the first light emitting diode, with one of the plurality of bottom sides of each of two adjacent refractive units of the plurality of refractive units being a common bottom side of the two adjacent refractive units, wherein the common bottom sides of the plurality of refractive units meet with each other at common points, and wherein each of the plurality of second light emitting diodes is aligned with one of the tops or one of the common points.

* * * * *